United States Patent [19]
Deese

[11] 3,738,186
[45] June 12, 1973

[54] VEHICLE DRIVE ASSEMBLY
[75] Inventor: Samuel H. Deese, Bel Vernon, Pa.
[73] Assignee: American Consolidated Industries, Inc., Brownsville, Pa.
[22] Filed: May 6, 1971
[21] Appl. No.: 140,875

[52] U.S. Cl. .................................................. 74/191
[51] Int. Cl. ........................................... F16h 15/16
[58] Field of Search ................. 74/191, 213; 192/65

[56] References Cited
UNITED STATES PATENTS
1,431,649 10/1922 Gillette ................................. 74/191
1,655,503 1/1928 Knoller ................................. 74/191
3,499,339 3/1970 Moore .................................. 74/191

Primary Examiner—Allan D. Herrmann
Assistant Examiner—Frank H. McKenzie, Jr.
Attorney—William J. Ruano

[57] ABSTRACT

This invention relates to a vehicle power transmission and differential unit having two pairs of cone drives in right angular relationship. One pair is stationarily mounted on a vertical axis and the other pair is resiliently mounted and movable along vertical tracks so as to selectively move each of the horizontally disposed cones in driving contact with either of the stationarily mounted cones so as to cause the vehicle to selectively move forwardly, rearwardly, to the right, to the left or to neutral.

4 Claims, 6 Drawing Figures

INVENTOR.
SAMUEL H. DEESE

BY William J. Ruano his ATTORNEY

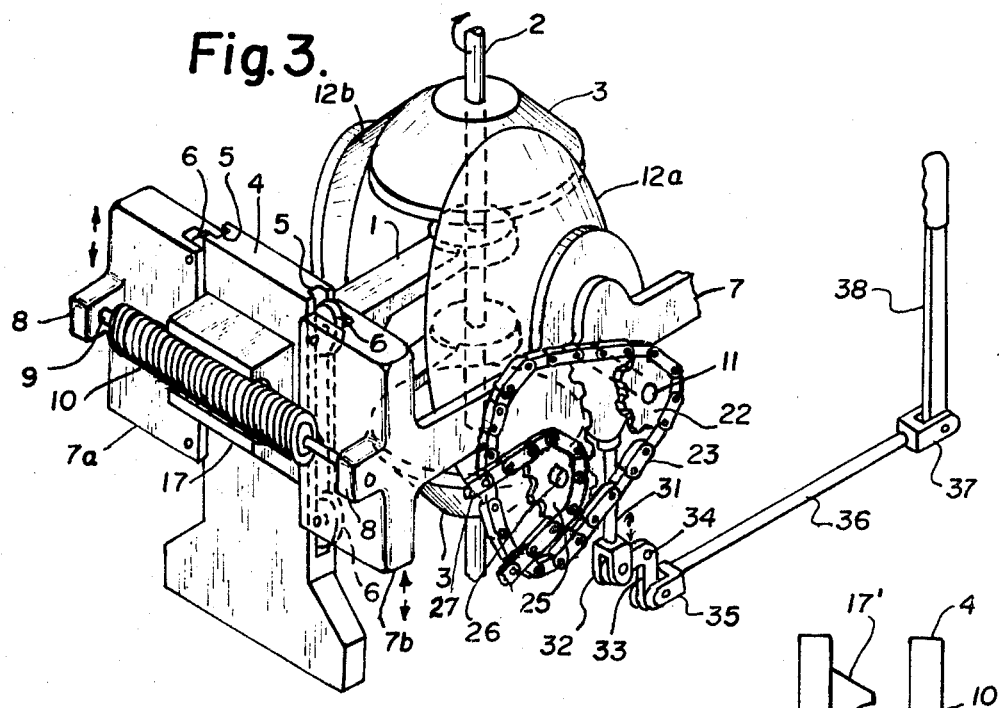
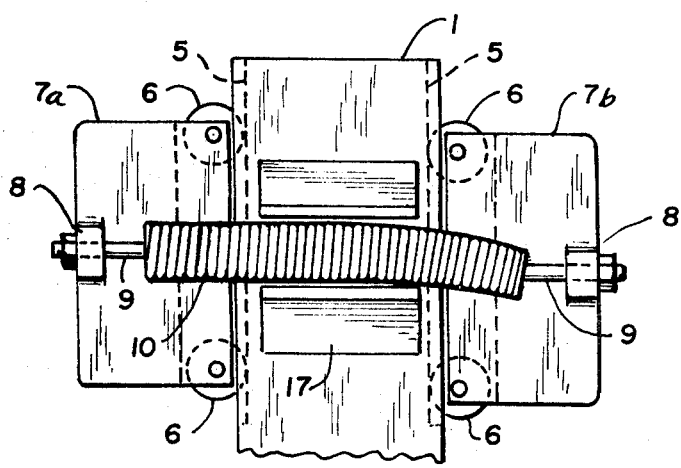
INVENTOR.
SAMUEL H. DEESE
BY
*William J. Ruano*
his ATTORNEY

VEHICLE DRIVE ASSEMBLY

This invention relates to a variable speed, vehicle power transmission and differential assembly of the type embodying two spaced drive cones and two spaced driven cones disposed at right angles thereto, the latter being separately movable into and out of frictional driving contact relationship with either of said drive cones to obtain forward, reverse, right and left turn movements of the vehicle.

The above described type of transmission is well known in the art as shown in U.S. Pat. Nos. 1,852,360; 1,633,316; 1,241,609; 1,197,535; and 3,306,132. However, such prior art devices have outstanding disadvantages in that they are cumbersome in construction and are not truly reliable in operation and require very substantial maintenance. For example, the last mentioned U.S. Pat. No. 3,306,132, relies upon the use of torsion bars for separately supporting movable frames for moving, through arcuate paths, confronting movable cones adapted for frictional engagement or disengagement with the spaced, stationarily mounted cones disposed at right angles thereto. Such torque rods have not provided satisfactory operation and have required almost continuous adjustment of their lengths in an endeavor to obtain accurate spacing between driving and driven cones. Such spacing has not been successfullymaintained even after time consuming adjustments, necessitating frequent adjustments and in spite of which it has not been possible to obtain synchronization of speeds of the two driven or output shafts, resulting in excessive wear of the cone surfaces and faulty drive operation.

A further disadvantage of such device has been the great tendency of the torsion bars to break at the supports because of the considerably large stresses imparted thereto by the frictionally driven cones, causing early break-down and short life of the transmission.

An object of my invention is to provide a novel vehicle power transmission and differential unit having the above-mentioned pairs of spaced cones disposed at right angles and embodying a mounting which will overcome the abovenamed disadvantages of the aforesaid prior art devices.

A more specific object of my invention is to provide, in a vehicle power transmission and differential assembly of the abovementioned friction cone drive type, a novel mounting for the respective opposed movable driven cones which will insure contact with only one, instead of both, of the stationarily mounted, spaced drive cones so as to prevent stalling and which assures synchronization of the drive shafts.

A further object of the invention is to provide a stationary mounting for the two spaced drive cones embodying vertical tracks on which are propelled, in opposite directions, yieldingly from a neutral position, two separate carriages, each of which mounts one of the movable driven cones to guide it in a rectilinear path, as compared to an arcuate path.

Other objects and advantages will become more apparent from a study of the following description, taken with the accompanying drawings wherein:

FIG. 3 is a top, perspective view of the assembly shown in FIGS. 1 and 2 together with chain and sprocket drives for two vehicle drive wheels; and, FIG. 4 is an enlarged, fragmentary view, as viewed from the left of FIG. 3, showing one of the carriages mounting one of the driven cones in a downward position relative to the other carriage which mounts the other driven cone.

Figure 1:
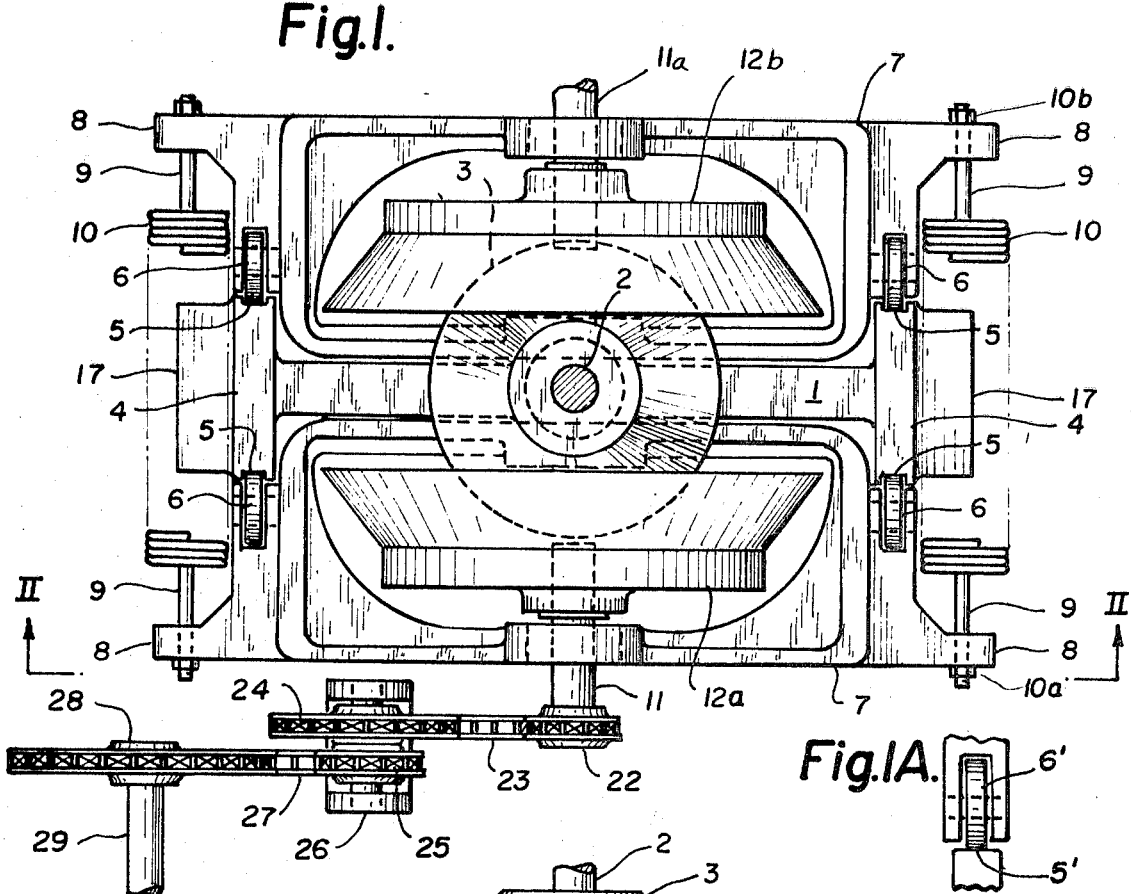
FIG. 1 is a top view of a vehicle transmission and differential assembly embodying the principles of my invention.
Figure 2:
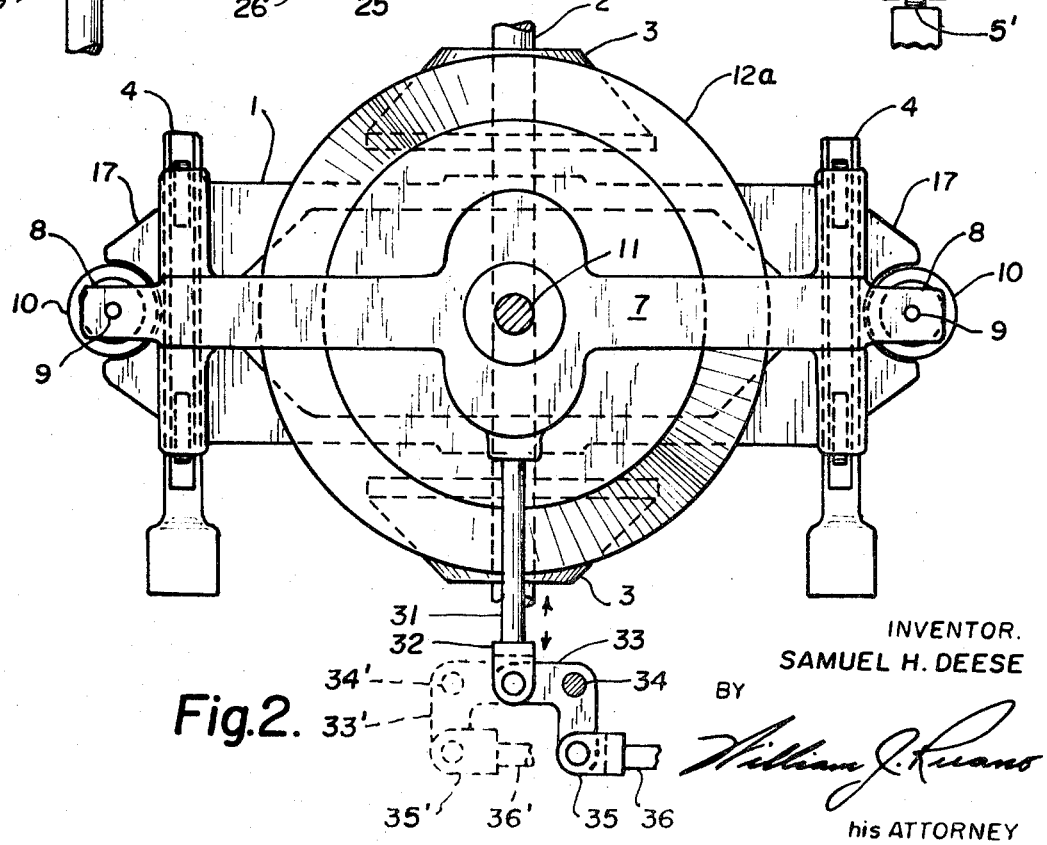
FIG. 2 is an elevational view thereof as viewed from the bottom of FIG. 1.

Referring more particularly to FIGS. 1, 2 and 3 of the drawings, numeral 1 denotes a stationary frame which is adapted to be mounted rigidly on the stationary frame of a vehicle (not shown). As shown more clearly in FIG. 3, the stationary frame 1 comprises a pair of vertically spaced arms terminating in bearing supports for drive shaft 2 which is driven by an internal combustion engine, preferably of the type used for driving lawn mowers, go carts, that is, comparatively small or by an electric motor.

Rigidly mounted on drive shaft 2 are a pair of vertically spaced drive cones 3, 3 having confronting concave surfaces, that is, with their apices extending outwardly. Drive shaft 2 is preferably driven in only one direction, such as the clockwise direction indicated by the arrows, as viewed from the top of FIG. 3. Thus both drive cones 3, 3 are likewise driven in a single and clockwise direction, as viewed from the top of FIG. 3.

Integrally secured to the stationary frame 1 is a stationary frame portion 4 provided with a pair of grooves or tracks 5 formed in opposite sides thereof, along which tracks are adapted to roll a pair of rollers 6, preferably antifriction rollers of any desired type. Rollers 6 are mounted on carriages 7a, 7b, each of which is provided with an integral extension 8 to form a bearing support for the ends 9 of a helical return spring 10. The tension of helical return spring 10 may be varied by adjusting bolts 10a threaded to opposite ends thereof. The central portion of spring 10 is stationarily held and mounted in a block 17 rigidly secured to the stationary frame portion 4 and having an arcuate cut-out portion for snugly encircling a portion of the perimeter of the central portion of spring 10 to provide a neutral position for the respective carriages 7a, and 7b.

Rotatably mounted on an arm of carriage 7b is driven cone 12a, and mounted on a similar arm integrally secured to carriage 7a, is driven cone 12b. Thus when the carriage 7b is moved downwardly by a control linkage, to be described hereinafter, to the position shown in FIG. 4, it will flex the right hand portion of spring 10, as viewed in FIG. 4, to a vertical position wherein the top portion of driven cone 12a contacts the upper drive cone 3, and the bottom portion of driven cone 12a is moved out of contact with the lower drive cone 3, so as to frictionally drive cone 12a so as to cause rotation of its rigidly secured driven shaft 11 in a given direction, such as the forward direction of the driven wheel (not shown). To provide speed reduction, gear 22(FIG. 1) rigidly mounted on driven shaft 11 drives a chain 23 which, in turn, drives a gear 24 rigidly secured to shaft 26 rotatably mounted on frame portion 4. This shaft drives a pinion 25 which, in turn, drives chain 27 which entrains about a sprocket wheel 28 rigidly secured to shaft 29 rigidly attached to one of the wheels of the vehicle (not shown).

Figure 1A:
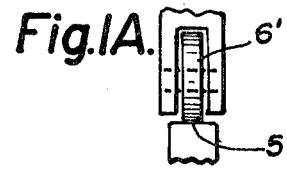

FIG. 1A shows a modification wherein all rollers, such as 6', will roll on flat surfaces 5' instead of grooves 5, 5 to prevent jamming in case of misalignment.

FIG. 3A shows a modification wherein block 17 is removed from frame portion 4 and supported on a separate frame 20 mounted on the vehicle frame 21 to provide completely independent supports for carriages 7a, 7b.

It will be noted that the entire drive for one wheel is mounted on the carriage 7b and is guided vertically by tracks 5 as a consequence of the application of a vertically upward or downward force on rod 31 to drive the output shaft 11 in one direction or an opposite direction. Operating lever 38, by the driver's seat, moves clevis 37, rod 36, clevis 35 and crankarm 33 to turn the latter about pivot 34 so as to either lift or lower clevis 32 and rod 31, depending upon the direction of movement of lever 38.

It should be noted that a duplicate speed-reducing chain drive and operating lever means ( not shown), similar to that described above, is driven by the other cone 12b and its dirven shaft 11a but which is hidden from view in FIG. 3, whereby cone 12b and its output shaft 11a will drive the chain drive, as described above, so as to effect rotation of the other drive wheel ( not shown). However, it will be modified as shown in FIG. 2 with linkage 33', 34', 35', 36' to effect opposite vertical movement of rod 31 by the same movement of lever 38.

Movement of the control lever 38 in one direction will move shaft 11 downwardly, together with carriage 7b, to the position shown in FIG. 4 flexing spring 10. Movement to "neutral" will tend to straighten out return spring 10 and return carriage 7b to a position corresponding to that of carriage 7a so that both cones 12a and 12b will be in neutral position, that is, both out of contact with drive cones 3, 3.

Should the control lever 38 move drive shaft 11 upwardly from "neutral", that is, above the height of carriage 7a, the lower portion of cone 12a will contact the lower drive cone 3 to effect rotation of cone 12a in an opposite direction from that obtained when carriage 7b was below the level of carriage 7a, as shown in FIG. 4. Thus, the wheel driven by the chain drive can be driven so as to move the vehicle either forwardly or backwardly.

Similarly, the opposite wheel, which would be located at the left of FIG. 3, can be driven either in a forward or reverse direction, depending upon whether carriage 7a is moved in one direction from the neutral position shown in FIG. 4 or in an opposite direction.

Therefore, each of the independently driven rear drive wheels of the vehicle may be rotated in either a forward or a rearward direction. This allows for various types of movement of the vehicle. For example, if both cones 12a, 12b are moved downwardly simultaneously by downward control movements of both carriages 7a and 7b to the level of carriage 7b shown in FIG. 4, the vehicle will move in one direction, say forwardly. On the other hand, if both carriages 7a and 7b are moved upwardly from the neutral position shown for carriage 7a in FIG. 4, the vehicle will move in the opposite direction, that is, rearwardly.

On the other hand, if carriage 7b and its corresponding cone 12a were moved downwardly from neutral, and carriage 7a and its cone 12b were moved upwardly from neutral, so as to provide frictional drive between the top portion of driven cone 12a and the upper drive cone 3 and, simultaneously, frictional drive between the lower cone 3 and the bottom portion of cone 12b, the respective wheels will be driven in opposite directions so as to effect turning movement, say a right hand turn. Conversely, if cone 12a were moved by its carriage 7b upwardly, and cone 12b were moved by its carriage 7a downwardly, the vehicle would turn in the opposite direction, that is, to the left. Of course, when both carriages 7a and 7b are in the neutral position, that is, in the position shown in FIG. 4 of carriage 7a, then neither of the drive cones 3, 3 will drive driven cone 12a and 12b, therefore the vehicle will not move in any direction irrespective of the speed of the power or drive shaft 2.

When both cones 12a and 12b are in driving contact with the upper drive cone 3 and lower drive cone 3, it will be noted that variable speeds may be obtained by varying the extent of vertical movement of cones 12a and 12b relative to the drive cones 3, 3 so as to provide an infinite variation in the speed at which cones 12a and 12b are driven, as well as the respective wheels driven by such cones. Thus, variations in forward speed or rearward speed may be obtained simply by varying the relative vertical distance of cones 12a and 12b with respect to the drive cones 3, 3 to vary the perimeter size at which frictional contact occurs.

The transmission and differential mechanism described above is suitable for a wide variety of vehicles, such as golf carts, go-carts, garden tractors, snow blowers, ski vehicles and the like, and may be used for drives for apparatus other than vehicles, such as machinery drives, boats, etc.

Thus it will be seen that I have provided a novel transmission and differential drive of the two cone pair type having a novel mounting for effecting yieldable movement of a driven cone into driving engagement with either an upper drive cone or a lower drive cone for effecting rotation of a driven shaft in one direction or in an opposite direction, selectively, depending upon the direction of movement, by a control lever, of the carriage mounting for the driven cone; furthermore, I have provided, in such drive, a pair of carriages which are movable along tracks by anti-friction rollers in a direction to cause selective drive contact of the driven cone ( connected to a wheel) by selective control movement of the carriage in either one direction or in opposite direction from a neutral position to obtain selective forward or rearward movement of vehicle front drive wheels or turning movement thereof; furthermore, I have provided a transmission and differential drive embodying two cone pairs disposed at right angles and wherein a unique spring means is provided for yieldably returning the carriages, mounting the respective movable driven cones, to a neutral position and which carriages insure that only one drive cone will frictionally engage the driven cone at one time, so as to avoid stalling that otherwise occurs when both drive cones frictionally engage the driven cone; furthermore, I have provided a transmission and differential drive suitable for golf carts, go-carts, lawn mowers, snow blowers and a wide variety of devices, which drive is relatively simple in construction, easy to maintain, and inexpensive to manufacture, and yet which is highly reliable in operation and has an amazingly longer life than prior art devices.

While I have illustrated and described a single specific embodiment of my invention, it will be understood that this is by way of illustration only and that various

I claim:

1. A drive assembly comprising a pair of drive cones rigidly secured in spaced relationship on a power shaft with their apices extending in opposite directions, which power shaft is adapted to be driven in a given direction by an external source of power, a stationary frame for rotatably mounting said power shaft, a carriage propelled on said stationary frame for rectilinear movement in opposite directions from a central neutral position, spring means for yieldably holding said carriage in said neutral position and which flexes when said carriage is moved from said neutral position, a driven cone rotatably mounted on said carriage, and control means for moving said carriage selectively in opposite directions than said neutral position, to provide frictional drive contact of said driven cone, selectively, with one of said drive cones or the other, and an output shaft driven by said driven cone, a second carriage which is propelled on said stationary frame in opposite directions from said neutral position, a second cone mounted on said second carriage, control means for selectively moving said second carriage in opposite directions from a neutral position to effect selective frictional driving engagement with either of said drive cones, and an output shaft driven by said second cone, whereby said respective output shafts may be driven in the same direction or in opposite directions either simultaneously or alternately.

2. A drive assembly as recited in claim 1, said spring means comprising a return spring, said stationary frame being provided with means for anchoring the mid-portion of said return spring, the ends of which return spring are connected to said respective carriages to yieldably urge them to a central, neutral position.

3. A drive assembly as recited in claim 2 wherein said anchoring means comprises a block having an arcuate groove, and wherein said return spring is a helical spring whose central portion snugly fits said arcuate groove, and wherein means are provided for adjustably varying the tension of said spring.

4. A drive assembly as recited in claim 2 together with speed reducing drive means for reducing the speed of each of said output shafts, and a wheel driven by each of said speed reducing drive means, whereby a pair of vehicle wheels may be driven simultaneously in a forward direction, or simultaneously in a rearward direction, or whereby either wheel may be driven in one direction while the other wheel is driven in an opposite direction, to effect selective turning movements of the vehicle to the right or left.

* * * * *